FIG. 4(a) AMOUNT OF INITIAL CONCENTRATION
$1.56 \times 10^{-4}$ mols
($Ag^+$: $3.12 \times 10^{-4}$ mols)
SOLUTION TEMPERATURE — 33 °C FIG. 5(a) AMOUNT OF INITIAL $Cu^{++}$ ADDITION
0.01g or $1.56 \times 10^{-4}$ mols
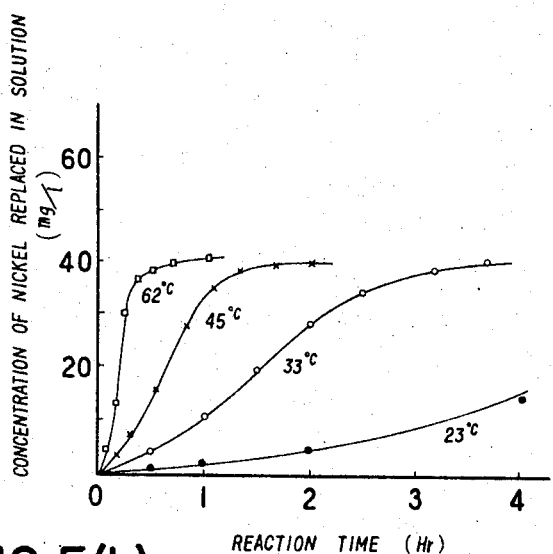
FIG. 5(b)
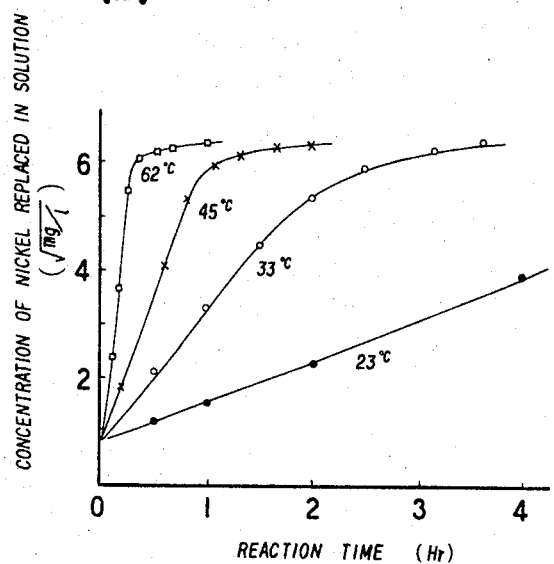

SOLUTION TEMPERATURE — 33 °C

United States Patent Office 3,453,101
Patented July 1, 1969

3,453,101
PROCESS FOR TREATING NICKELIFEROUS ORE
Yoshikazu Takahashi, Machida-shi, Koujiro Kojima, Tokyo, and Hisashi Kahata Sagamihara-shi, Japan, and Iwao Iwasaki, Minneapolis, Minn., assignors to Fuji Iron & Steel Co., Ltd., Chiyodaku-Tokyo, Japan
Filed Oct. 16, 1964, Ser. No. 404,241
Claims priority, application Japan, Oct. 21, 1963, 38/56,556; Aug. 13, 1964, 39/46,633; Aug. 14, 1964, 39/46,762
Int. Cl. C22b 1/08, 23/00; B03d 1/08
U.S. Cl. 75—2     15 Claims

ABSTRACT OF THE DISCLOSURE

The present invention relates to a combination process of segregation roasting-flotation or magnetic separation for recovering nickel from iron laterites and oxidized nickel ore. The ore is mixed with a chloridizing agent such as sodium or calcium chloride, and a solid reducing agent such as coke or charcoal, and is roasted to precipitate most of the metallic nickel on the reducing agent particles and a part of the metallic nickel is coagulated together and isolated, the precipitated nickel is replaced with a metallic salt having a lower ionization tendency from that of nickel, and the nickel is then separated by a conventional flotation procedure or alternatively the nickel may be recovered by employing a magnetic separation procedure.

---

The present invention relates to a process for treating nickel ores such as a nickel-chrome iron ore, an oxide nickel ore, a silicious nickel ore and the like, which comprises mixing said ore with halide and solid reducing agents, roasting the mixture at a temperature above 700° C. to precipitate metallic nickel and then recovering the nickel concentrate by flotation or in some cases magnetic separation, either singly or in combination.

To describe the present invention more specifically, the raw ore is subjected to grinding to obtain desirably sized ore, particularly under 65 mesh to assure favourable conditions in the subsequent roasting and flotation operations. In case of chrome-containing ore such as nickel-, chrome-ferrous iron ore (the so-called laterite), the raw ore may be directly, or after grinding, subjected to chrome removing treatment before it is used as starting materials.

The ground ore of the above type, in general, contains much water, and when the ore is directly roasted, the capacity of the roasting furnace is decreased and the required amount of the solid reducing agent and additives is increased, as well as the rapid heating to be described later is impeded and the loss of the nickel content increases owing to the scattering dust of the material carried by water vapour being emitted during the roasting. So it is advantageous to remove unnecessary water from the ore to eliminate the above difficulties.

Thus, ores such as the so-called laterite and garnierite contain more than about 20 percent of free water and more than about 10 percent of combined water, and it is a common practice to dry the ore to remove the free water content only. However, it is more advantageous to calcine the ore above 100° C. to remove the combined water. As to the calcining temperature, which varies depending upon the type of ore to be treated, the calcination may be done above 700° C. in the case of the garnierite (the temperature for removing combined water is about 680° C.) and above 380° C. in case of such an ore as laterite which contains much limonite (the temperature for removing combined water in goethite is about 360° C.).

To illustrate the results obtained by such calcination, much better nickel recovery and much better quality of concentrate can be obtained under the same conditions in respect to the additives, the solid reducing agent, the roasting and the flotation, as shown in Table 1.

TABLE 1

| Type of Ore | Roasting Conditions | Nickel Content in Concentrate in percent | Nickel Recovery (net) in percent |
|---|---|---|---|
| Laterite | Not Calcined | 7.53 | 77.6 |
|  | Calcined at 700° C | 8.80 | 83.1 |
| Garnierite | Not Calcined | 16.60 | 77.8 |
|  | Calcined at 750° C | 19.35 | 86.9 |

Next, a halide such as sodium chloride, calcium chloride, magnesium chloride, ammonium chloride, calcium fluoride, potassium bromide or a mixture thereof in the form of powder or solution is added to the ore together with coke powder, charcoal powder, wood powder and the like, and uniform mixing is applied.

Nickel recovery is affected by the type and amount of a halide to be added, and selection is made depending on the roasting conditions and the type of ore to be treated from the economical point of view. The effects of various halides are set forth in Table 2.

Better results can be obtained as the amount of the additives increase up to a certain degree beyond which the results do not show substantial improvement. FIG. 1 shows these tendencies.

The size of the solid reducing agent is maintained almost under 48 mesh so that favourable conditions in the

TABLE 2

| Halide | Amount Added, percent | Roasting Temperature, °C. | Nickel Content, percent | Nickel Recovery, percent | Coke Addition, percent |
|---|---|---|---|---|---|
| $CaCl_2$ | 10 | 950 | 19.4 | 87.0 | 3.5 |
| $NH_4Cl$ | 10 | 950 | 19.6 | 80.3 | 3.5 |
| $MgCl_2$ | 17 | 950 | 21.2 | 54.8 | 3.5 |
| NaCl | 10.6 | 1,050 | 11.8 | 70.5 | 3.5 |
| $NaCl+CaCl_2$ | 10.6 | 1,050 | 15.0 | 72.9 | 3.5 |
| $NH_4Cl+CaF_2$ | 8.5 | 950 | 18.5 | 36.8 | 3.5 |
| $CaF_2$ | 7.4 | 950 | 5.0 | 30.0 | 3.5 |
| KBr | 10.3 | 950 | 9.2 | 21.5 | 3.5 | grinding, roasting and flotation operations may be obtained. A larger size of the reducing agent will render it difficult to obtain a uniformly dispersed mixture, while a smaller size of the reducing agent will require a greater amount of the flotation agent.

An optimum amount of the reducing agent to be added is determined in relation to the amount of halide addition. A smaller or larger amount of the reducing agent will result in inferior results. FIG. 2 shows these tendencies.

About 2–6 percent of the reducing agent is considered to be adequate, but in case of an ore such as laterite which contains some organic substances in its crude ore the above percent range may be lowered.

The mixture thus obtained, in its powder form or in the form of an agglomerate, is treated in a roasting furnace. In agglomeration, a suitable amount of water and binder may be added to the mixture.

Roasting is done by direct heating or indirect heating in a reducing, neutral or slightly oxidizing atmosphere. Temperature is increased above 700° C. as quickly as possible, and the temperature is maintained for a certain time. Heating velocity more than 5° C. per minute up to 700° C. is preferable in order to minimize the amount of halide additives to be decomposed under the reaction temperature and it has been discovered through experience that metallic nickel particles grow if a certain temperature above 700° C. is maintained for more than 15 minutes, which facilitates the flotation and magnetic separation.

The correlation between the heating velocity and the nickel recovery is shown in Table 3.

TABLE 3

| Heating Velocity, ° C./minute | Ni Content in Concentrate, percent | Ni Recovery, percent |
|---|---|---|
| 10 | 21.3 | 73.2 |
| 5 | 22.5 | 64.0 |

NOTE.—Material: garnierite.

The reaction progressively proceeds up to the roasting temperature of about 700° C., but beyond 1100° C. some types of ores may be partially sintered, slag forming substances may be fused or metallic iron may precipitate and only undesirable results are obtained. Each type of the ore being roasted has its optimum roasting temperature.

Correlation between the roasting temperature and nickel recovery in case of garnierite is shown in FIG. 3, and that in case of laterite of Omonhon is shown in Table 4.

TABLE 4

| Roasting Temperature, ° C. | Ni Content in Concentrate, Percent | Ni Content in Tailing, Percent | Ni Recovery Percent |
|---|---|---|---|
| 900 | 11.1 | 0.62 | 36.2 |
| 950 | 22.1 | 0.27 | 65.3 |
| 1,000 | 13.7 | 0.33 | 65.5 |

NOTE.—Material was not calcined, 4 percent of CaCl$_2$ and 2 percent of coke were added.

In this way, the particles of metallic nickel grow and precipitate in the ore being roasted, while most of the iron in the ore remains as magnetite and thus, the precipitated metal is almost pure nickel containing some cobalt. This precipitated particle of nickel is susceptable of being oxidized and care must be taken that the roasted ore does not come in contact with oxygen.

For this purpose the roasted ore is cooled and discharged in a neutral gas such as nitrogen, a slightly oxidizing gas such as a carbonic acid gas, a slightly reducing gas such as combustion gas, or in water. Further, if necessary, the roasted ore thus cooled is ground in such a manner as the ore does not come in contact with oxygen and then is suspended and dispersed in water. This is done for the purpose of separately recovering precepitated metallic nickel or solid reducing agent on which metallic nickel adheres. In most cases, it suffices only to lightly loosen the agglomerated particles in the raw ore, but stronger grinding may be required depending on the type of the ore and the roasting temperature.

Then, a metallic salt having lower ionization tendency than nickel is added to the suspension to precipitate the metal on the surface of the metallic nickel so that the subsequent flotation operation may be facilitated. This metallic salt functions as a kind of activator in the flotation, based on the substitution by oxidation-reduction reaction.

As a metal having a lower ionization tendency than nickel, there are Sn, Pb, Te, Sb, As, Bi, Cu, Hg, Ag, Pt and Au. As for Sn and Pb, their ionization tendency is close to that of nickel, and therefore their salts are not effective. Salts of Pt and Au are too expensive to be used, and salts of Te, Sb, As and Bi are not so good. Therefore, salts of copper, mercury, and silver are most useful.

The reaction rates of these metals when ionized in substituting metallic nickel are explained in comparison as follows:

$Cu^{++}$ (as copper sulfate), $Ag^+$ (as silver nitrate), $Hg^{++}$ (as mercury chloride) and $Pb^{++}$ (as lead acetate) were selected as metal ion, and experiments were done on these ions under the solution temperature of 33° C., with the initial addition of $1.56 \times 10^{-4}$ mol, the results of which are shown in FIG. 4.

Their equilibrium constants in substitution reactions, calculated from the known value of free energy of formation, are shown as follows:

$$Ni^o + Cu^{++} \rightarrow Cu^o + Ni^{++} (K = 6.3 \times 10^{19})$$
$$Ni^o + 2Ag^+ \rightarrow 2Ag^o + Ni^{++} (K = 3 \times 10^{35})$$
$$Ni^o + Hg^{++} \rightarrow Hg^o + Ni^{++} (K = 2 \times 10^{37})$$
$$Ni^o + Pb^{++} \rightarrow Pb^o + Ni^{++} (K = 1.6 \times 10^4)$$

When the above equilibrium constants (K) are compared with the results shown in FIG. 4, it is noted that the reaction rate gets larger as K increases under the same condition, and as noted from FIG. 4–b, each of the ions has a linear relation with the square root of the concentration of nickel in solution, and with the time, and that lead is not an effective activator.

The substitution reaction rate has also varied depending on the temperature of the suspension, and the metal ion concentration therein. And experiments were done on their effects in case of $Cu^{++}$, the results of which are shown in FIGS. 5 and 6.

Therefore, it is necessary to determine the amount of the metallic salt to be added, the solution temperature and the treating time, depending on the type of the metallic salt to be added.

Namely, the substitution for nickel proceeds more quickly as the concentration of the metallic salt to be added increases, and the nickel particles are completely coated, but on the other hand, the metallic nickel dissolves; hence the loss of nickel yields.

For this reason, care must be taken that the reaction takes place with a solution concentration maintained as high as possible (30 to 40 percent) with a possible minimized amount of the metallic salt to be added. This amount of the metallic salt is determined depending on the amount and size of metallic nickel in the roasted ore, the amount of coke and others (the metallic salt adheres onto the surfaces of coke and other particles and is consumed). As for the solution temperature, the reaction proceeds more quickly as the temperature is higher, and thus the temperature should be maintained somewhat high, with a thorough stirring. For example, in case of $Cu^{++}$, it is noted from FIG. 5 that 30 minutes, one hour and three hours are respectively required for almost completing the substitution reaction at the temperatures of 60° C., 45° C. and 30° C., and even in case of $Hg^{++}$ which has a larger reaction rate than $Cu^{++}$ by more than 30 minutes are required at 33° C. From the above facts, it is most practical to effect the reaction at a temperature above 30° C. In other words, it is most desirable to select such conditions which permit the substitution by the added metal of the substantial part of the surface of metallic nickel particles.

Thus, it is possible to recover metallic nickel with high purity and high yield by replacing the surface of the metallic nickel particles with other metal as above described, thus overcoming the difficulties in flotation of the metallic nickel involved in the conventional process. The effects of the addition of metallic salts are illustrated in Table 5.

TABLE 5.—ADDED METALLIC SALTS AND THEIR EFFECTS

| Metallic Salt | Amount Added in kg./t. | Flotation Results | |
|---|---|---|---|
| | | Ni Content in Concentrate in Percent | Ni Yield in Percent |
| No Addition | | 7.12 | 10.2 |
| CuSO$_4$ | 1.5 | 26.75 | 86.7 |
| AgNO$_3$ | 1.8 | 21.00 | 70.2 |
| HgCl$_2$ | 1.2 | 20.90 | 74.6 |

Remarks: Raw material is garnierite. Conditions of roasting, etc. are same.

In some cases it may be possible to further increase the flotation efficiencies by sulfurating the metal film formed by the replacement adding hydrogen sulfide or water-soluble sulfide such as sodium sulfide. Namely, although the metallic particles of copper, silver, and mercury have some degree of flotation feasibility, in some cases, it is more desirable that these metals are in the form of sulfide.

Namely, the flotation results were not substantially effected by the addition of sulfurating agent, when the roasting, cooling, and crushing were carried out carefully on laboratory scale and immediately the flotation was done. However, in case of a sample which had been left several days so that the surface of the nickel was considered to have been slightly oxidized, the flotation results were improved by the addition of sodium sulfide. An example of the results is shown in Table 6.

TABLE 6.—FLOTATION EFFECTS BY SULFURATION

|  | Ni Content in Concentrate (Percent) | Ni Yield (Percent) | Remarks |
|---|---|---|---|
| Na₂S Addition | 19.3 | 86.9 | Flotation immediately after roasting. |
| No Addition | 19.0 | 86.3 | |
| Na₂S Addition | 26.4 | 84.2 | Flotation several days after roasting. |
| No Addition | 14.7 | 64.1 | |

In this case, one may add a metallic salt activating agent after sulfurating the metallic nickel (with partially oxidized surface) or one may sulfurate the metallic nickel after substituting it by the metallic salt; the latter procedure gives better flotation result.

Into the mineral solution thus activated, collectors, such as xanthate, aerofloat, mercaptane, thiocarbanilide, mercapto-benzo-thiozole, fatty acid, organic sulfonic acid, amine, etc., and frothing agents, such as pine oil, camphor oil, aliphatic alcohol, ether, phenol, etc., are added. And a flotation operation is effected under a controlled temperature and pH.

Th flotation results will not be substantially affected by the type of frothing agent to be used, but the results will vary in some degree depending on the type of collector to be used. For example, as shown in Table 7, there are indications that a higher nickel recovery, though with a lower nickel content in the concentrate, is obtained by using xanthate as anion collector than by using amine as cation collector.

TABLE 7.—RELATION BETWEEN THE TYPE OF COLLECTOR AND NICKEL RECOVERY

| Collectors | Nickel Content in Concentrate, percent | Nickel Recovery, percent |
|---|---|---|
| Potassium isoamyl xanthate | 19.9 | 72.5 |
| Dodecylamine | 25.0 | 70.2 |

Conditions: CaCl₂ 7%, Coke 3.5%; Roasted at 950° C.; Flotation temperature 43° C.; pH 5.6.

Effects of the solution temperature and pH on the flotation are shown in Table 8 and Table 9.

TABLE 8.—RELATION BETWEEN SOLUTION TEMPERATURE AND NICKEL RECOVERY

| Temperature | Nickel Content in Concentrate Ni, percent | Nickel Recovery, percent | Remarks |
|---|---|---|---|
| 40 | 30.5 | 80.4 | CaCl₂, 10%. |
| 50 | 26.7 | 85.0 | Coke, 1.8%. |
| 60 | 20.0 | 80.8 | |

TABLE 9.—RELATION BETWEEN SOLUTION pH AND NICKEL RECOVERY

| | pH 5-6 | | pH 10-12 | | |
|---|---|---|---|---|---|
| Test No. | Nickel Content in Concentrate Ni, percent | Nickel Recovery, percent | Nickel Content in Concentrate Ni, percent | Nickel Recovery, percent | Remarks |
| 1 | 15.9 | 79.3 | 17.0 | 72.5 | Roasted at 950° C. |
| 2 | 28.6 | 84.8 | 37.1 | 80.9 | with varied amount |
| 3 | 16.5 | 86.7 | 24.2 | 81.3 | of halides and solid |
| 4 | 18.5 | 85.8 | 24.9 | 75.7 | reducing agents. |
| 5 | 16.5 | 77.8 | 19.5 | 66.0 | |

Referring to the flotation conditions, a solution temperature between 20–60° C. is suitable, and as for pH, a higher nickel recovery is obtained with an acid solution but much better nickel content in concentrate is obtained with an alkali solution. With an acid solution having pH value below 5, the resolution of precipitated nickel increases and thus the loss of nickel increases thereby, which requires a separate recovering process.

The treatments mentioned above relate to the recovery of nickel from nickel ores by flotation, and another method of treatment in single or in combination with the above-mentioned treatments is proposed for a specific type of one.

For example, in case of an iron ore containing chromium, such as iron ore containing nickel and chromium (so-called laterite), the raw ore is preliminarily removed of chromium and thus chromium-removed ore is subjected to the above-mentioned treatments to recover nickel, and the flotation tailing may be, directly or after magnetic separation, used as iron making material.

In general, when an iron ore composed of mainly limonite containing nickel and chromium is used in a blast furnace as iron making material, almost all of the nickel and chromium is reduced into produced pig iron, and the nickel is not removed during the steel making step and the residual nickel in steel affects adversely the properties of steel, while the chromium is considerably removed during the steel making steps, but a high chromium slag is so low in fluidity that it hinders the steel making operation. However, such iron ores containing nickel and chromium are found in Japan, the Philippines, Indonesia, New Caledonia, as well as in Central America and Africa, and their deposits are almost unlimited. Particularly in Japan where most of the iron making material is supplied from abroad, large attention and interest has long been put on these ores. Many various attempts were made in the past to utilize these ores by removing nickel and chromium on a commercial scale, but none of these attempts were successful; they involve much difficulties from both technical and economical points of view.

Nickel in iron oxide ores containing nickel appears mainly as garnierite type mineral, and it is considered that a part of the nickel is also present in the crystal lattice of the limonite. Thus the nickel intimately coexists with the iron, and it has long been known it is difficult to apply a conventional flotation process to these ores. In this connection some methods have been reported in which the nickel particles are made to grow by a roasting treatment, or the ore is converted into a flotation feaseible form and then subjected to subsequent treatments.

For example, according to one of the conventional methods an iron oxide ore containing nickel in powder form is, directly or after being agglomerated, reduced with a reducing gas to obtain metallic nickel, and then (in case of the agglomerate, crushing is done) the metallic iron is preferentially floated to remove excessive iron, and the remaining iron and nickel are simultaneously floated. The results of this method are shown in Table 10.

TABLE 10

| | Weight (g.) | Total Nickel | Metallic Nickel | Total Iron | Metallic Iron |
|---|---|---|---|---|---|
| Raw Ore | 200 | 1.05 | | 35.5 | |
| Roasted Ore | 192 | | 0.89 | | 14.2 |
| Metallic Iron | 30 | | 0.50 | | 86.0 |
| Mixture of— | | | | | |
| Metallic Iron | 6.4 | | 23.80 | | 40.5 |
| Nickel Tailing | 143 | | 0.08 | | 0.05 |

According to another reported method, an iron oxide ore containing nickel is roasted with the addition of FeS and coke and then the roasted ore is subjected to a combined treatment of flotation and magnetic separation. It has been reported that a concentrate containing 7–8 percent of nickel was obtained from an ore containing 0.8–1.5 percent of nickel with a recovery of 38–95 percent by this method.

In the above two examples of the conventional method, it is possible to increase the ratio of nickel to iron in the separation above cannot accomplish the recovery of nickel. The results shown in Table 11 illustrate this.

TABLE 11.—SOLID REDUCTION OF GARNIERITE

| Reduction Conditions | | | Ore Composition | | Concentrate, percent | | | Tailing, percent | | |
|---|---|---|---|---|---|---|---|---|---|---|
| Temperature, °C. | Time, hr. | Coke, percent | Fe₂O₃, percent | NiO, percent | Yield Weight | Nickel Content | Nickel Recovery | Yield Weight | Nickel Content | Nickel Recovery |
| 1,200 | 10 | 10 | 12.02 | 2.89 | 7.4 | 2.65 | 6.83 | 92.6 | 2.27 | 93.17 |
| 1,250 | 8 | 10 | 12.02 | 2.89 | 5.9 | 2.784 | 7.11 | 94.1 | 2.15 | 92.89 |
| 1,300 | 8 | 10 | 12.02 | 2.89 | 3.6 | 2.75 | 4.05 | 96.4 | 2.11 | 95.95 |

NOTE.—100% ground ore—100 mesh. SALA drum type magnetic separator is used.

concentrate, but in case of the first example the nickel recovery is relatively low, and on the other hand the nickel content in the iron concentrate even after nickel is removed is too high for the concentrate to be used as iron making material, while in case of the second example the nickel content in the concentrate is relatively low and the residual sulphur content in the iron concentrate causes difficulties.

Whereas according to the present invention, the above difficulties can be eliminated and possibilities of complete utilization of the useful elements contained in an iron oxide ore containing nickel and chromium are attained. Next, for the treatment of an ore relatively low in iron As seen from the table, the nickel content of the magnetic concentrate cannot be expected to increase, even when the garnierite mixed with 10 percent of coke is roasted under 1300° C. and the roasted ore is crushed under 100 mesh and subjected to a wet type magnetic separator.

It has been known that both nickel and iron can be recovered by reducing them at higher temperatures into ferro-nickel luppe. Results of reducing roasted laterite are shown in Table 12, which shows a good nickel recovery but a very low nickel content in the magnetic concentrate, and the concentrate thus obtained is difficult to be utilized as nickel concentrate.

TABLE 12.—RESULTS OF REDUCTION AND MAGNETIC SEPARATION

| Sample | Magnetic Separation Yield Weight, percent | | Chemical Composition of Concentrate, percent | | | | | | |
|---|---|---|---|---|---|---|---|---|---|
| | Concentrate | Tailing | Total Fe | Cr | Ni | Al₂O₃ | SiO₂ | P | S |
| Omonhon Overflow | 74.8 | 25.2 | 88.62 | 0.46 | 1.79 | 2.99 | 1.50 | 0.44 | 0.014 |
| Wakasa Overflow | 69.7 | 30.3 | 89.34 | 0.36 | 0.89 | 2.99 | 2.04 | 0.019 | 0.007 |
| Miyagawa Overflow | 65.2 | 34.8 | 89.43 | 0.40 | 1.62 | 1.23 | 3.14 | 0.016 | 0.004 |

| Sample | Chemical Composition of Tailing, percent | | | | | Recovery in Concentrate, percent | | Removal Rate into Tailing, percent | | |
|---|---|---|---|---|---|---|---|---|---|---|
| | Total Fe | Cr | Ni | Al₂O₃ | SiO₂ | Fe | Ni | Cr | Al₂O₃ | SiO₂ |
| Omonhon Overflow | 41.49 | 3.05 | 0.03 | 13.12 | 10.82 | 86.4 | 99.3 | 69.4 | 59.6 | 70.9 |
| Wakasa Overflow | 28.16 | 3.88 | 0.08 | 20.37 | 24.12 | 87.9 | 96.7 | 82.5 | 74.8 | 83.7 |
| Miyagawa Overflow | 28.64 | 2.41 | 0.06 | 9.35 | 33.90 | 85.4 | 98.1 | 76.4 | 80.2 | 85.3 | content, such as a garnierite, the nickel concentrate can be obtained by roasting the ore mixed with halides and a solid reducing agent at a temperature between 700° C.–1100° C. to precipitate metallic nickel and then separating the metallic nickel by magnetic separation.

Namely, up to the roasting step, the same methods and conditions as already described are applied, but after the roasting step, the roasted ore is crushed and subjected to magnetic separation to recover the nickel in view of the fact that the metallic nickel is a ferromagnetic substance. However, as mentioned above, as most of the iron content in the roasted ore is in the form of magnetite, the nickel is recovered together with the iron into the concentrate, and thus the nickel content of the concentrate is relatively low. Accordingly, in case of a nickel ore containing a relatively high content of iron, it is not possible According to the present invention, it is possible to promote the growth of the metallic nickel particles at a relatively low temperature by a roasting treatment with addition of a halide and solid reducing agent, and the slag-forming substances remain unfused so that the crushing operation after the roasting is very easy and the precipitated nickel is separated in a form of simple substance by simple crushing, and thus it is possible to recover nickel of higher content at a higher recovery.

The nickel content and recovery in the product obtained vary depending on the roasting temperature, the degree of crushing the roasted ore and the magnitude of magnetic field of the magnetic separator to be applied, but these factors may be selected according to a specific purpose and in view of economy. Some experimental examples are shown in Table 13.

TABLE 13.—RESULTS OF MAGNETIC SEPARATION

| Roasting Temperature, °C. | Magnitude of Magnetic Field, Gauss | Nickel Content in Concentrate, percent | Nickel Content in Tailing, percent | Nickel Recovery, percent | Remarks |
|---|---|---|---|---|---|
| 800 | 1,000 | 23.70 | 1.81 | 38.5 | Crushed. |
| 930 | 1,000 | 31.30 | 0.70 | 77.0 | Crushed under 150 mesh. |
| 1,050 | 1,000 | 30.80 | 0.52 | 83.1 | Do. |
| 950 | 5,000 | 4.67 | 0.55 | 88.9 | Not crushed (under 60 mesh). |
| 1,000 | 5,000 | 6.42 | 0.34 | 92.8 | Do. |
| 1,050 | 2,800 | 11.50 | 0.36 | 90.0 | Do. | to enhance remarkably the nickel content in the concentrate by this method, but in case of an ore relatively low in iron content, this method has advantages. It is possible, of course, to obtain a concentrate of high nickel content through magnetic separation and the aforementioned flotation, even in case of an ore relatively high in iron content.

Many methods have been known for recovering nickel and iron from such an ore by reduction roasting and magnetic separation, but reduction roasting and magnetic In general, a higher nickel recovery will be obtained by a separation with a higher magnetic field, but in this case the content in concentrate tends to lower. While with a lower magnetic field a higher content in concentrate is obtained because better separation of nickel in the form of simple substance is effected by crushing the roasted ore.

Referring to the effects of crushing, the results of magnetic separation of garnierite samples roasted under the same roasting conditions are shown in Table 14.

TABLE 14.—RESULTS OF MAGNETIC SEPARATION BY CLASSIFICATION OF CRUSHING DEGREE

|  | Not Crushed | | Crushed under 150 mesh | |
|---|---|---|---|---|
|  | Concentrate | Tailing | Concentrate | Tailing |
| Yield Wt., Percent | 21.9 | 78.1 | 7.65 | 92.35 |
| Ni, Percent | 11.50 | 0.36 | 30.80 | 0.52 |
| Ni Recovery | 90.0 | 10.0 | 83.10 | 16.90 |
| Cr, Percent | 6.87 | 0.52 | 1.44 | 1.80 |
| Cr Recovery | 78.8 | 21.2 | 6.2 | 93.8 |
| Total Fe, Percent | 25.38 | 7.42 | 55.80 | 7.63 |
| Total Fe Recovery | 48.9 | 51.5 | 37.7 | 62.3 |
| Magnitude of Magnetic Field | 2,800 gauss | | 1,000 gauss | |

It cannot be decided immediately which procedure is superior from the economical point of view, but the recovery of nickel, iron and solid reducing agent is better by separation with high magnetic power without crushing, and thus the application of several steps of magnetic separation and crushing in combination will give a prefixed grade with a higher recovery.

In the preceding descriptions, the flotation and the magnetic separation relative to the nickel recovery from a roasted ore are separately described, but these two treatments may be used in combination according to the type of ore and purposes, and better results can be obtained by the combined use of these treatments than the results by the independent use of either one of the two.

Namely, it is possible by flotation to recover only the metallic nickel in the form of simple element or the metallic nickel precipitating on the surface of the solid reducing agent or on the surface of the accompanying gangue particles, while fine powder nickel precipitating within the inner portion of the gangue particles goes into the tailing, thus lowering the nickel recovery. In this case, it is possible to recover the nickel in the tailing by subjecting the tailing to further finely dividing and repeated flotations, but it is not desirable to finely divide the whole of tailing from the economical point of view as well as in view of the efficiency of the flotation.

Whereas in magnetic separation, the middling is recovered by separation with enough magnetic power, and thus recovered middling is directly used as low grade nickel concentrate or further finely divided to be subjected to the repetition of flotation or magnetic separation, thus enabling a higher grade of nickel concentrate to be obtained at a higher recovery. Results of an example of this procedure are shown in Table 15 which indicate that it is possible to recover 45% of the nickel contained in the tailing from the flotation by subjecting the tailing to magnetic separation, and the middling thus obtained can be utilized by treating it with the flotation middling.

TABLE 15.—EFFECTS OF COMBINED USE OF FLOTATION AND MAGNETIC SEPARATION

[An Example in case of garnierite]

| Products | Amount Produced | Nickel, Percent | Nickel Distribution, Percent | Remarks |
|---|---|---|---|---|
| Flotation Concentrate | 8.75 | 25.30 | 71.80 |  |
| Middling | 11.50 | 2.27 | 8.43 |  |
| Tailing | 79.72 | 0.76 | 19.77 |  |
| Magnetic Separation Concentrate | 6.40 | 4.29 | 8.84 | Flotation tailing is used. |
| Tailing | 73.32 | 0.37 | 10.93 | |

It is impossible by magnetic separation alone to enhance the nickel content in case of such an ore as an iron ore relatively high in iron content and containing nickel and chromium. In this case, however, it is possible to separate and recover a nickel concentrate and an iron concentrate by subjecting the roasted ore to magnetic separation to separate it into an iron-nickel concentrate, non-magnetic chromite and gangue substances and then activating only the metallic nickel particles with a metallic salt according to the aforesaid treatment. In this way, the required amount of the flotation treatment for a low grade ore high in chromium and gangue content as well, is lowered, and thus the required amount of the metallic salt and reagent to be added is decreased as well as the operation is much easier.

For the treatment of a nickeliferous sulfide ore (for example, an ore containing nickeliferous pyrrhotite and pentlandite), many other methods have been known. The process of the present invention can also be applied to such ores of low grade, or such ores containing partially oxidized ore. Namely, in case of such nickel ore as is difficult to separate the nickel in the form of simple substance therefrom by mechanical crushing, it is possible to recover the nickel advantageously by the aforementioned flotation or magnetic separation in single or in combination, when the aforementioned roasting has been effected to precipitate the metallic nickel.

The present invention will be fully understood through the following examples and the drawings.

Figure 1:
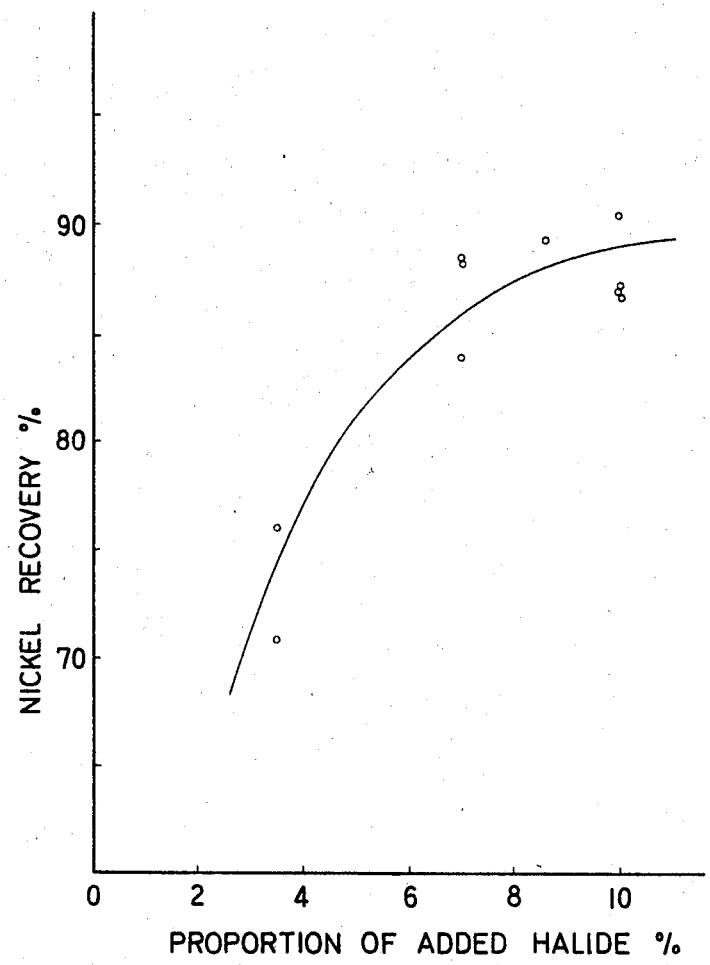
FIG. 1 shows the correlation between the proportion of added halide and the nickel recovery.
Figure 2:
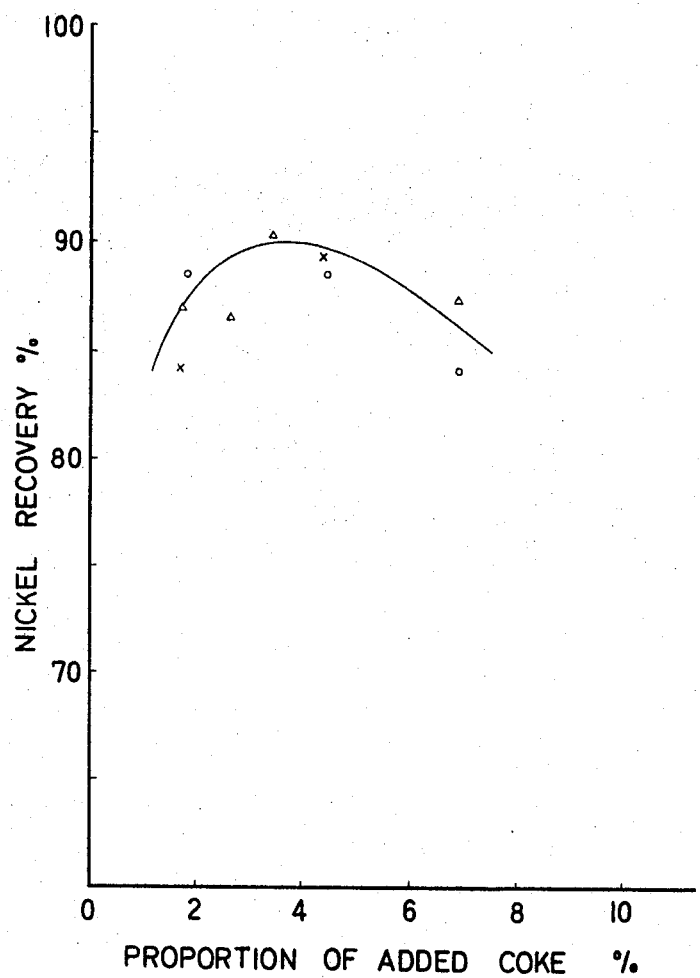
FIG. 2 shows the correlation between the proportion of added solid reducing agent and the nickel recovery.
Figure 3:
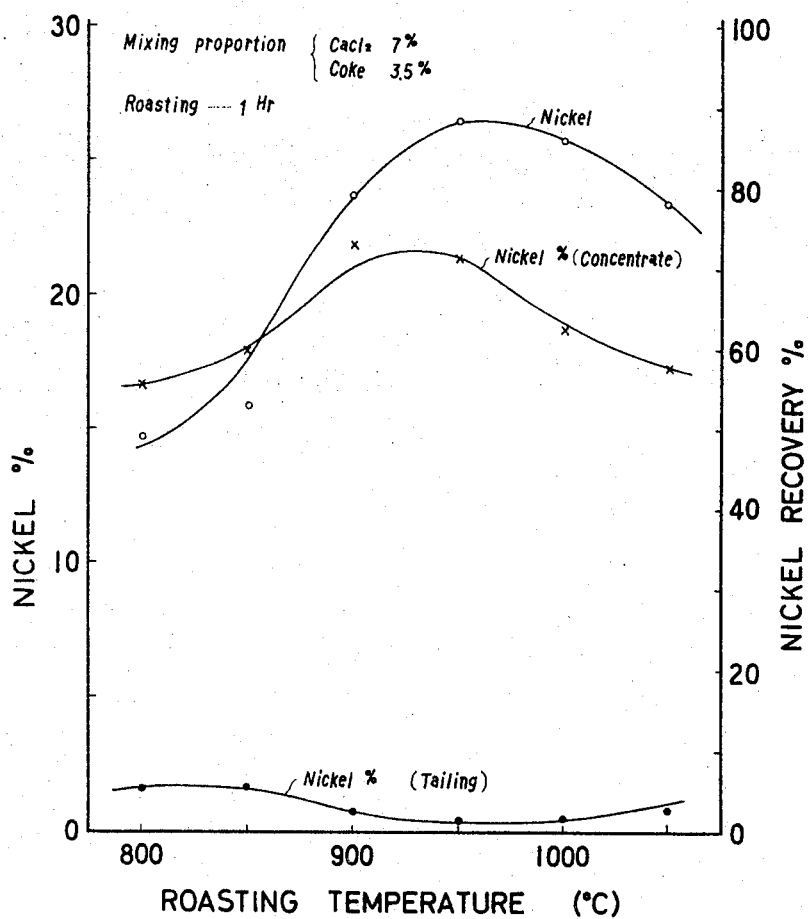
FIG. 3 shows the correlation between the roasting temperature and the nickel recovery.
Figure 4B:
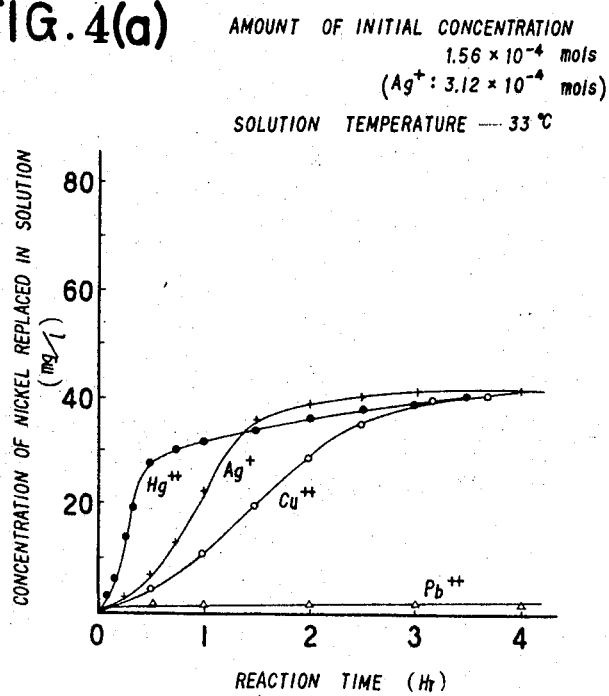
Figure 4B:
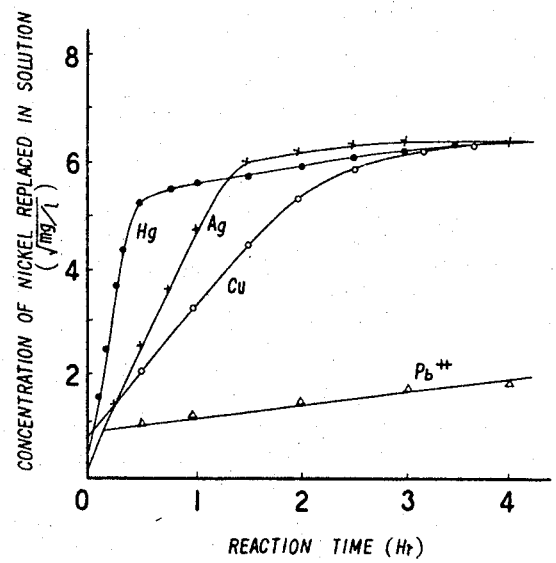

FIGS. 4($a$) and ($b$) show effects of various ions on the substitution reaction rate in the present invention.

FIG. 5 shows effects of the solution temperature on the substitution reaction in the present invention.

Figure 6A:
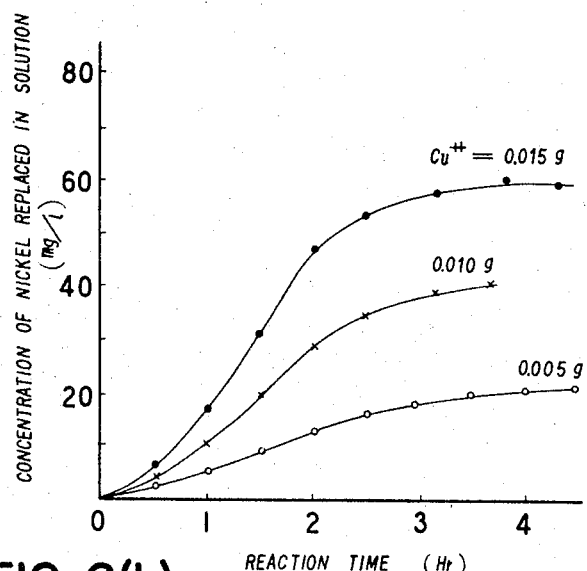
Figure 6B:
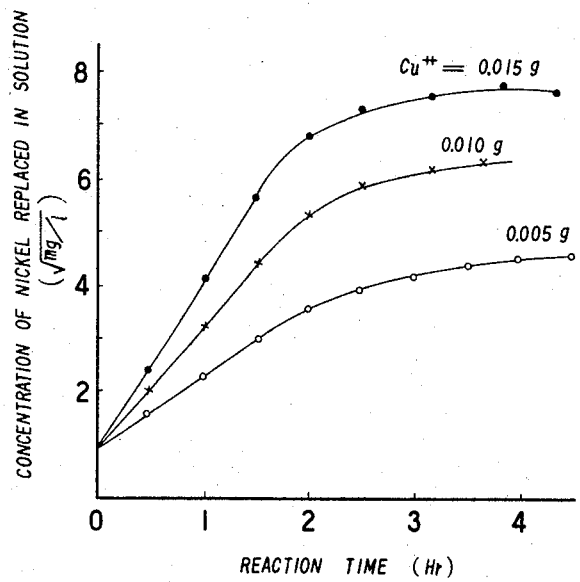

FIG. 6 shows effects of the amount of initial $Cu^{++}$ addition on the substitution reaction rate.

Example 1

Powder ore under 38μ (overflow of cyclone classification) of an iron oxide ore containing nickel of Omonhon, the Philippines, was mixed with 3 percent of powdered coke under 48 mesh and 2.5 percent of calcium chloride ($CaCl_2 \cdot 2H_2O$), and roasted at 970° C. for one hour. Water was added to the roasted ore to obtain a slurry of 35% pulp concentration, and 1.5 kg. per ton of the roasted ore of cupric sulfate was added to the slurry maintained at 60° C., which was then stirred for 20 minutes. The slurry thus treated was transferred to a flotation machine to obtain a slurry of 10 percent concentration maintained at 40° C., to which 500 g. per ton of sodium sulfide was added and then stirring was applied for five minutes. Then sulfuric acid was added to the slurry to control the pH at 6 and then 500 g. per ton of potassium isoamylxanthate and one drop of pine oil were added to the slurry, which was then subjected to flotation for five minutes.

Then 300 g. per ton of potassium iso-amyl-xanthate was added to the tailing, which was subjected to flotation for three minutes. The nickel rougher concentrate and scavenger concentrate thus obtained were collected and subjected to cleaner flotation. Then the results as shown in Table 16 were obtained.

TABLE 16

|  | Weight, Percent | Ni, Percent | Ni Recovery |
|---|---|---|---|
| Raw Ore |  | 0.99 |  |
| Roasted Ore | 100.0 | 1.13 |  |
| Cleaner Concentrate | 6.2 | 15.83 | 86.3 |
| Cleaner Tailing | 11.2 | 0.32 |  |
| Scavenger Tailing | 82.6 | 0.14 |  |

Example 2

Nickeliferous iron oxide ore of Miyakawa, Japan was crushed under 60 mesh and dewatered by heat drying. Thus prepared powder ore was mixed with 28 percent of powdered coke under 48 mesh, 5 percent of sodium chloride, and 5.3 percent of calcium chloride. The mixture was heated up to 1050° C. in a roasting furnace with a heating rate of 10° C./min., held at the temperature for one hour, then cooled to about 300° C. in a stream of nitrogen, then put into water, slightly crushed by a wet-type crusher, and treated by a thickener to obtain a pulp of 40 percent concentration. The pulp thus prepared was maintained at 60° C. by means of a conditioner and stirred for five minutes with addition of 1.6 kg./t. of silver nitrate, which was then diluted to 20 percent pulp concentration. The pulp thus prepared was subjected to flotation at a temperature of 45° C. wtih addition of 500 g./t. of potassium iso-amyl-xanthate and small amount of pine oil.

The rougher tailing were subjected to scavenger flotation with addition of 250 g./t. of xanthate and rougher concentrate and scavenger concentrate were collected and subjected to cleaner flotation. In this way, a cleaner concentrate containing 8.8% of the nickel content was obtained from the raw ore containing 0.8% nickel with a nickel recovery of 83.1 percent.

Example 3

Silico magnesia nickel ore of New Caledonia was crushed under 65 mesh and calcined at 750° C. The calcined ore was well mixed with 3.5 percent of powdered coke under 48 mesh, 10 percent of ammonium chloride with addition of a small amount of water and then pelletized. This pelletized ore was heated up to 900° C. in a roasting furnace with a heating rate of 10° C./min., maintained at the temperature for one hour and then cooled to the room temperature in a stream of nitrogen. This roasted ore was slightly crushed (under 65 mesh) in water, and maintained at 50° C. and stirred for 15 minutes with addition of 1.2 kg. per ton of the roasted ore of mercuric chloride. The slime thus obtained was sulfurated by passing hydrogen sulfide therethrough for 2 minutes, and then lime was added thereon to control the pH to 10. Then the slime was subjected to flotation for 8 minutes with addition of 250 g. per ton of the roasted ore of Aerofloat, 250 g. of potassium iso-amyl-xanthate, and a small amount of pine oil, the results of which are shown in Table 17.

TABLE 17

| | Weight, Percent | Ni Percent | Ni Distribution, Percent |
|---|---|---|---|
| Raw Ore | | 2.89 | |
| Roasted Ore | 100 | 3.25 | |
| Concentrate | 10.8 | 19.61 | 80.3 |
| Tailing | 89.2 | 0.52 | 19.7 |

Example 4

Silico magnesia nickel ore of New Caledonia was crushed under 65 mesh, mixed with 4% of powdered coke under 48 mesh, and 4 percent of anhydrous calcium chloride, and then roasted at 950° C. for one hour with a heating rate of 10° C./min. The roasted ore was crushed under 150 mesh by a wet process to obtain a pulp of 35% concentration and of 60° C., which was then stirred for 20 minutes with addition of 1.5 kg. per ton of the roasted ore of cupric sulfate. The slime thus obtained was transferred to a flotation machine to obtain a pulp of 10% concentration maintained at 40° C., which was then stirred for 5 minutes with addition of 500 g. per ton of sodium sulfide. After the pH of the pulp had been controlled to 6 with sulfuric acid, the pulp was subjected to rougher flotation for 5 minutes with addition of 500 g. per ton of potassium iso-amyl-xanthate and one drop of pine oil. Further, the rougher tailing was subjected to scavenger flotation for 3 minutes with addition of 300 g. per ton potassium iso-amyl-xanthate.

The rougher and scavenger nickel concentrate was collected and subjected to cleaner flotation. Then the results as shown in Table 18 were obtained.

TABLE 18

| | Weight, Percent | Ni, Percent | Ni Yield, Percent |
|---|---|---|---|
| Raw Ore | | 3.98 | |
| Roasted Ore | 100.0 | 4.05 | |
| Cleaner Concentrate | 13.1 | 26.75 | 86.7 |
| Cleaner Tailing | 14.2 | 0.75 | |
| Scavenger Tailing | 72.7 | 0.59 | |

Example 5

Garnierite ore having a chemical composition shown in Table 19 was crushed under 65 mesh, and mixed with 3.5 percent of powdered coke under 48 mesh and 7 percent of anhydrous calcium chloride. The mixture was roasted at 1050° C. for one hour. The roasted ore was crushed under 150 mesh and then separated by a wet type magnetic separator (Sala type) at 1000 gauss, the results of which are shown in Table 20.

TABLE 19.—CHEMICAL COMPOSITION OF GARNIERITE ORE OF NEW CALEDONIA

| Ni | 2.89 |
|---|---|
| Total Fe | 12.02 |
| MgO | 24.34 |
| SiO$_2$ | 40.80 |
| Co | 0.11 |
| Cr | 0.71 |
| MnO | 0.31 |
| CaO | 0.10 |
| Al$_2$O$_3$ | 0.75 |
| C.W | 11.63 |

TABLE 20.—CHEMICAL COMPOSITION OF PRODUCTS OF MAGNETIC SEPARATION AND RESULTS THEREOF

| | Concentrate | Tailing |
|---|---|---|
| Amount Produced, percent | 7.65 | 92.35 |
| Ni, percent | 30.80 | 0.52 |
| Ni Recovery, percent | 83.10 | 16.90 |
| Other Elements: | | |
| C, percent | 1.44 | 1.80 |
| Fe, percent | 55.80 | 7.63 |
| S, percent | 0.07 | |
| MgO$_2$, percent | 3.09 | |
| SiO$^2$ percent | 5.83 | |

The compositions of the nickel concentrates thus recovered are shown in Table 21.

TABLE 21.—EXAMPLES OF THE CHEMICAL COMPOSITION OF NICKEL CONCENTRATE

| Raw Ore | Concentrate Composition, percent | | | | | | | Raw Ore | |
|---|---|---|---|---|---|---|---|---|---|
| | Ni | Fe | Co | C | SiO$_2$ | Al$_2$O$_3$ | MgO | Ni | Fe |
| Laterite (Omonhon) | 15.83 | 50.20 | 0.45 | 9.75 | 3.81 | 6.93 | | 0.84 | 43.85 |
| Do | 22.35 | 44.45 | 0.78 | 4.81 | | | | 0.99 | 49.25 |
| Laterite (Wakasa) | 4.24 | 14.63 | 0.27 | 65.95 | | | | 0.43 | 47.05 |
| Laterite (Miyakawa) | 8.80 | 28.87 | 0.23 | 41.28 | | | | 0.84 | 47.17 |
| Garnierite | 19.35 | 26.05 | | 18.02 | 16.18 | | 9.92 | 2.89 | 12.02 |
| Do | 28.55 | 22.95 | | 7.53 | 19.42 | | 10.97 | 2.89 | 12.02 |
| Do | 37.10 | 27.20 | | 9.77 | 12.08 | | 6.70 | 2.89 | 12.02 |

As compared with the nickel or nickel material which has been conventionally used, the nickel concentrate thus obtained is characterized in that (a) it is of relatively high grade, (b) it is in the form of powder or finely divided powder, (c) it easily dissolves in acid or ammonia and (d) it contains a reducing agent.

Thus this nickel concentrate in the form of powder or agglomerate can be utilized in the conventional process for producing metallic nickel or used as material for nickel alloys.

In case of using this concentrate as material for nickel alloys, the concentrate may be treated as follows, if the metallic salt, such as salts of Cu, Ag, Hg, Pb, S etc., which has been added in the process of the present invention is harmful to the production of nickel alloys.

Metals of the metallic salts, sulphur of the sulfurating agents, and sulphur and phosphorus of the flotation reagents cover or adhere to the surface of the ore particles, and easily dissolve in acid, and thus these elements can be removed by a short-time rinsing by dilute acid.

However, as the metal which has been precipitated by substitution has a lower ionization tendency than that of nickel, will dissolve if it contacts with the acid for a long time and the metal of a lower ionization tendency which has been rinsed out will again precipitate, and thus it is necessary to finish the rinsing within several minutes.

Table 22 shows the results which were obtained when ferronickel was produced by dissolving the concentrate which had been rinsed with 1 N hydrochloric acid.

TABLE 22.—PRODUCTION OF FERRONICKEL FROM CONCENTRATE

| Treatment of Concentrate | Flotation Nickel Concentrate | Copper Removed Concentrate | Ferronickel Produced |
|---|---|---|---|
| Analysis in percent: | | | |
| Ni | 25.35 | 25.80 | 48.18 |
| C | 18.02 | 19.10 | 0.84 |
| T.Fe | 26.05 | 28.44 | 49.06 |
| MgO | 7.92 | 6.23 | |
| SiO$_2$ | 10.68 | 8.50 | |
| Cu | 1.10 | 0.05 | 0.05 |
| S | 0.48 | 0.12 | 0.01 |

What we claim is:

1. A process for the treatment of nickeliferous ore which comprises the steps of mixing the nickeliferous ore with a halide selected from the group consisting of sodium chloride, calcium chloride, ammonium chloride, calcium flouride, and potassium bromide, and a solid reducing agent selected from the group consisting of charcoal, coke, and powdered wood, roasting the mixture for precipitating most of the metallic nickel, mixing the roasted ore with water, adding a metallic salt selected from the group consisting of salts of copper, silver, and mercury which have a lower ionization tendency than that of nickel for replacing the surface of the metallic nickel with these metals, and applying a conventional flotation procedure for separating and recovering nickel concentrate.

2. A process as set forth in claim 1, comprising the step of subjecting the nickel concentrate to a magnetic separation procedure.

3. A process according to claim 1, comprising the step of drying the nickeliferous ore before the roasting step.

4. A process according to claim 1, comprising the step of calcining the nickeliferous ore before the roasting step.

5. A process as set forth in claim 1, wherein the roasting of the ore is performed by heating the ore at a heating rate of more than 5° C. per minute from 150° C. up to 700° C. and maintaining the ore at a temperature above 700° C. for more than 15 minutes.

6. A process as claimed in claim 1, wherein the surface of the metallic nickel is replaced by the metal of a metallic salt having a lower ionization tendency than the nickel at a pulp temperature of about 30° C.

7. A process as set forth in claim 1, wherein the flotation step is carriedl out at a pulp temperature of between 20 to 60° C. and a pH between 4 and 12.

8. A process as set forth in claim 1, comprising the step of removing chromium from a nickeliferous ore containing chromium before the step of mixing the ore with a halide and reducing agent.

9. A process as set forth in claim 1, comprising the step of treating the nickel concentrate separated in the flotation procedure with dilute acid to remove the metal and sulfide precipitated on the surface of the nickel.

10. A process as set forth in claim 1, comprising the step of grinding the roasted ore prior to the step of mixing the roasted ore with water.

11. A process for the treatment of nickeliferous ore comprising the steps of mixing the nickeliferous ore with a halide selected from the group consisting of sodium chloride, calcium chloride, ammonium chloride, calcium fluoride, and potassium bromide, and a solid reducing agent selected from the group consisting of charcoal, coke, and powdered wood, roasting the mixture for precipitating most of the metallic nickel on the surface of said solid reducing agent and separating and recovering nickel concentrate by a magnetic separation procedure.

12. A process according to claim 11, comprising the step of drying the nickeliferous ore before the roasting step.

13. A process according to claim 11, comprising the step of calcining the nickeliferous ore before the roasting step.

14. A process according to claim 11, wherein the roasting of the ore is performed by heating an ore at a heating rate of more than 5° C. per minute from 150° C. to up to 700° C. and maintaining the ore at a temperature above 700° C. for more than 15 minutes.

15. A process as set forth in claim 11, comprising the step of removing chromium from a nickeliferous ore containing chromium prior to the step of mixing the ore with a halide and a solid reducing agent.

References Cited

UNITED STATES PATENTS

| 1,288,121 | 12/1918 | Morse | 75—2 |
| 1,346,175 | 7/1920 | Caron | 75—82 |
| 1,480,212 | 1/1924 | Lamoth | 75—82 |
| 1,487,145 | 3/1924 | Caron | 75—82 |
| 1,717,160 | 6/1929 | Kichline | 75—82 |

L. DEWAYNE RUTLEDGE, *Primary Examiner.*

TERRY R. FRYE, *Assistant Examiner.*

U.S. Cl. X.R.

75—20, 82, 111, 119